United States Patent [19]
Sumimoto et al.

[11] Patent Number: 5,211,680
[45] Date of Patent: May 18, 1993

[54] CONTROL SYSTEM FOR ENGINE WITH AUTOMATIC TRANSMISSION

[75] Inventors: Takayuki Sumimoto, Hiroshima; Toshio Nishikawa, Fuji; Daisaku Moriki, Hiroshima, all of Japan

[73] Assignee: Mazda Motor Corp., Hiroshima, Japan

[21] Appl. No.: 675,261

[22] Filed: Mar. 27, 1991

[30] Foreign Application Priority Data

Mar. 30, 1990 [JP] Japan ................................. 2-81063

[51] Int. Cl.$^5$ ............................................ B60K 41/06
[52] U.S. Cl. ........................................ 74/858; 74/844; 74/851
[58] Field of Search ............... 74/851, 854, 855, 858, 74/859, 844

[56] References Cited

U.S. PATENT DOCUMENTS

| | | | |
|---|---|---|---|
| 4,403,527 | 9/1983 | Mohl et al. | 74/858 X |
| 4,716,788 | 1/1988 | Kita | 74/858 |
| 4,800,781 | 1/1989 | Yasue et al. | 74/851 X |
| 5,012,695 | 5/1991 | Kyohzuka et al. | 74/851 X |
| 5,036,728 | 8/1991 | Kawasoe et al. | 74/858 |
| 5,038,287 | 8/1991 | Taniguchi et al. | 74/851 X |
| 5,047,936 | 9/1991 | Ishii et al. | 74/858 X |

FOREIGN PATENT DOCUMENTS

59-97350 6/1984 Japan.

*Primary Examiner*—Richard M. Lorence
*Assistant Examiner*—Benjamin Levi
*Attorney, Agent, or Firm*—Wenderoth, Lind & Ponack

[57] ABSTRACT

A control system for an engine with an automatic transmission, including an output reducing system for reducing an output of the engine by a predetermined quantity in a speed change operation of the automatic transmission, so as to suppress a speed change shock generated in the speed change operation; and an output reduction control system for controlling a start timing of operation of the output reducing system so as to make a timing when output reduction of the engine is completed by the output reducing system coincide with a start timing of an actual gear shift operation of the automatic transmission. Accordingly, the engine output is reduced in the speed change operation of the automatic transmission, and the speed change shock generated in the speed change operation can be greatly suppressed by making the timing when the output reduction of the engine is completed coincide with the start timing of the actual gear shift operation of the automatic transmission.

8 Claims, 5 Drawing Sheets

CONTROL SYSTEM FOR ENGINE WITH AUTOMATIC TRANSMISSION

BACKGROUND OF THE INVENTION

1. Field of the Invention

The present invention relates to a control system for an engine with an automatic transmission, and more particularly to an improvement in such a control system for reducing an engine output during a speed change operation of the automatic transmission and suppressing a speed change shock generated in the speed change operation.

2. Description of the Prior Art

Generally, in a vehicle including an engine capable of generated a large torque and an automatic transmission in combination, a speed change clutch of the automatic transmission is intentionally slipped for a long time in a speed change operation, so as to reduce a speed change shock of the vehicle generated in the speed change operation and also to reduce an impact force to be applied to a speed change mechanism in the automatic transmission. However, such a long-time slippage of the clutch promotes wearing of the clutch to cause a reduction in durability of the automatic transmission, for example. Thus, there is a problem in reliability of the automatic transmission.

To cope with this problem, there a technique has been proposed in Japanese Laid-open Patent Publication No. 59-97350, for example, wherein a speed change operation of the automatic transmission is detected, and an engine output is reduced by a predetermined quantity by retarding an ignition timing, for example, in the speed change operation detected above, thereby suppressing the speed change shock and shortening the slip time of the clutch.

In the conventional control system for the engine with the automatic transmission as mentioned above, as shown by a time chart in FIG. 2, engine output reduction control is not started immediately after a speed change operation command signal of the automatic transmission is generated. That is, after the speed change operation command signal is generated, a start timing of an actual shift operation of a speed change gear in the automatic transmission is detected as a timing when a turbine rotational speed of a torque converter or an engine rotational speed reaches an inflection point, and the output reduction control by output reducing means is started at the timing of reaching of the inflection point.

This is mainly due to the following reasons. Until the actual shift operation of the speed change gear is started after the speed change operation is started to operate a solenoid valve in a hydraulic system, a response lag Ta is generated due to a response lag of the hydraulic system. Furthermore, the response lag time Ta fluctuates due to deterioration by aging or the like. For this reason, the output reduction control of the engine is started at a timing when after the response lag time Ta has elapsed.

However, a response lag time Tc also exists due to a response lag on the engine side until the engine output is actually reduced by a predetermined quantity after starting of the output reduction control. Accordingly, in the conventional output reduction control where the output reduction control is started at the timing of detection of the inflection point, a start timing of an actual period of the output reduction is delayed from a start timing of a demanded period of the output reduction. Thus, these start timings cannot be made to coincide with each other, so that the speed change shock cannot be sufficiently suppressed.

If the start timing of the speed change operation is made to be in accord with the start timing of the output reduction control, another problem occurs in that an engine brake is generated upon shift-up in the automatic transmission at acceleration of the vehicle to slow down the acceleration of the vehicle since the response lag time Tc of the engine is shorter than the response lag time Ta of the automatic transmission.

To solve the above problems, a technique has been proposed in U.S. patent application Ser. No. 356,451 for deciding an engine output reduction period in a shift-up operation and a shift-down operation of the automatic transmission by providing a first predicting means for predicting an end timing of the shift-up operation on the basis of an engine rotational speed when the shift-up operation is detected, and a second predicting means for predicting an end timing of the shift-down operation on the basis of a time length from a timing of detection of the shift-down operation. However, the start timing of the engine output reduction period is given as a constant value considering the response lag of the hydraulic system in the automatic transmission. Accordingly, when the response lag time of the automatic transmission fluctuates due to deterioration by aging or the like, the start timing of the actual period of the output reduction is not certainly decided with respect to the start timing of the demanded period of the output reduction. As a result, the speed change shock cannot ),et be sufficiently suppressed.

SUMMARY OF THE INVENTION

It is accordingly an object of the present invention to provide a control system for an engine with an automatic transmission which can make a demanded period of output reduction of the engine almost coincide with an actual period of output reduction of the engine.

To achieve the purpose described above, the present invention provides a control system for an engine with an automatic transmission, comprising an output reducing means for reducing an output of said engine by a predetermined quantity in a speed change operation of said automatic transmission by advancing or retarding an ignition timing, so as to suppress a speed change shock generated in the speed change operation; a speed change operation start timing detecting means for detecting input of a speed change operation command signal into said automatic transmission; a response lag time measuring means for measuring a response lag time Ta of said automatic transmission from a timing of detection of said speed change operation command signal to a start timing of an actual gear shift operation of said automatic transmission in which start timing is identified by detecting an inflection point of an input rotational speed of said automatic transmission; a delay time storing means having a plurality of memory areas each preliminarily storing a learning value Tb(LRN) of a delay time Tb from the timing of detection of said speed change operation command signal to an output timing of an engine output reduction command signal for starting output reduction of said engine on the basis of a relationship to a throttle opening and an automatic transmission operating oil temperature; a output reduction control means for outputting said engine output reduction command signal to said output reducing means when said learning value Tb(LRN) of said delay time Tb preliminarily stored in said each memory area has elapsed from the timing of detection of said speed change operation command signal; a delay time calculating means for calculating said delay time Tb by subtracting a substantially constant time Tc from the output timing of said engine output reduction command signal to an end timing of output reduction of said engine, from said response lag time Ta measured by said response lag time measuring means, so as make the timing when the output of said engine reaches to a predetermined reduced value coincide with the start timing of the actual gear shift operation of said automatic transmission; and a learning value updating means for comparing said delay time Tb calculated by said delay time calculating means with said learning value Tb(LRN) stored in the corresponding memory area of said delay time storing means, and calculating a new value of said learning value Tb(LRN) if a difference between said delay time Tb and said learning value Tb(LRN) is not less than a given value, and then updating said learning value Tb(LRN) previously stored in the corresponding memory area to store said new value into the corresponding memory area.

According to the present invention of the above-mentioned constitution, when the speed change operation of the automatic transmission is started, there is a response lag time Ta from the start timing of the speed change operation to the timing when the input rotational speed of the automatic transmission reaches the inflection point. The response lag time Ta of the automatic transmission has an uncertain fluctuation factor due to deterioration by aging or the like. After measuring the response lag time Ta of the automatic transmission, the response lag time Tc of the engine is subtracted from the response lag time Ta to calculate the delay time Tb. The response lag time Tc of the engine is a substantially constant time based on the specification characteristics of the engine, and it can be preliminarily decided with almost no fluctuation due to deterioration by aging. The learning value Tb(LRN) is calculated by sequential learning of the calculated delay time Tb during a predetermined period, and the calculated learning value Tb(LRN) is employable in the engine output reduction control in the next time. In other words, the learning value Tb(LRN) employed in the previous time is employable in the engine output reduction control in the present time. When a time equal to the learning value Tb(LRN) previously calculated has elapsed from the start timing of the speed change operation, the engine output reduction control is started.

In summary, the response lag time Ta of the automatic transmission having an uncertain fluctuate on factor due to deterioration by aging or the like is detected every time the speed change operation is carried out. Then, the current learning value Tb(LRN) is calculated by subtracting the response lag time Tc of the engine as a substantially certain value from the response lag time Ta measured above. The engine output reduction control is started when the time equal to the current learning value Tb(LRN) has elapsed from the start timing of the speed change operation of the automatic transmission. Accordingly, the timing when the output of the engine reaches to a predetermined reduced value can be made to almost accurately coincide with a start timing of the demanded period of the engine output reduction.

DETAILED DESCRIPTION OF THE PREFERRED EMBODIMENTS

There will now be described a preferred embodiment of the present invention with reference to the accompanying drawings.

Figure 1:
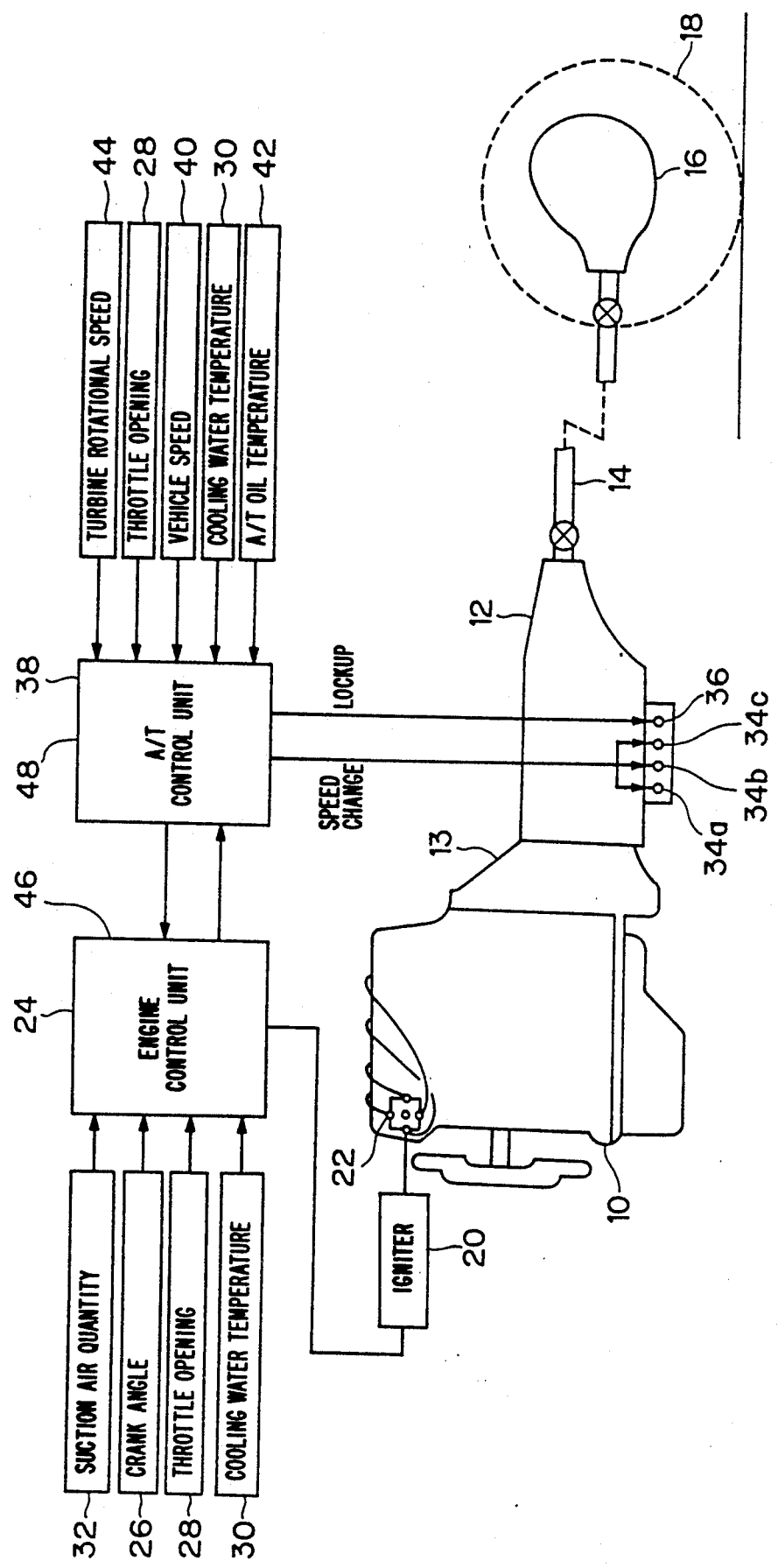
FIG. 1 is a schematic illustration of a preferred embodiment of the control system for the engine with the automatic transmission according to the present invention.

Referring to FIG. 1 which shows a schematic construction of the control system for the engine with the automatic transmission according to the present invention, reference numeral 10 designates an engine of a straight four cylinder type, and reference numeral 12 designates an automatic transmission of a four-speed type connected through a torque converter 13 to a rear side of the engine 10. The automatic transmission 12 is connected through a propeller shaft 14 to a rear differential gear 16. Reference numeral 18 designates rear tires.

The engine 10 is provided with an igniter 20 for generating a high voltage in a secondary coil and with a distributor 22 for distributing the output voltage from the igniter 20 to an ignition plug in each cylinder. The igniter 20 is controlled by an engine control unit 24. To the engine control unit 24 are connected a crank angle sensor 26 for detecting a crank angle, a throttle sensor 28 for detecting an opening angle of a throttle valve, a water temperature sensor 30 for detecting a cooling water temperature, and an air flow meter 32 for detecting a suction air quantity. The engine control unit 24 controls the igniter 20 so as to ignite the ignition plugs at ignition timings when an operating condition of the engine 10 becomes optimum, according to signals from the sensors 26, 28, 30 and 32.

The automatic transmission 12 is provided with speed change mechanisms 34a, 34b and 34c constructed of solenoid switches or the like for effecting speed change to each gear position and with a lockup mechanism 36 constructed of a solenoid switch or the like for locking up a certain gear position. The speed change mechanisms 34a, 34b and 34c and the lockup mechanism 36 are controlled by an automatic transmission control unit 38.

To the automatic transmission control unit 38 are connected a vehicle speed sensor 40 for detecting a vehicle speed, the throttle sensor 28 and the water temperature sensor 30. As is well known, a speed change schedule map defined by a relationship between a throttle opening and a vehicle speed is preliminarily stored in the automatic transmission control unit 38. On the basis of this speed change map, the automatic transmission control unit 38 controls a speed change operation of the automatic transmission 12 according to the information obtained from the vehicle speed sensor 40 and the throttle sensor 28.

In this preferred embodiment, an engine output reduction control unit 46 is constructed of the engine control unit 24 and the ignition system including the igniter 20 to be controlled by the engine control unit 24. The engine output control unit 24 controls to retard an ignition timing by a predetermined value from an optimum timing for generation of a maximum output, thereby reducing an engine output by a predetermined quantity.

The automatic transmission control unit 38 functions as shift operation detecting means 48 for detecting a start timing of an actual shift operation of a speed change gear in the automatic transmission 12 as a change in input rotational speed of the automatic transmission 12. That is, the shift operation detecting means 48 is constructed of the automatic transmission control unit 38 and a turbine rotation sensor 44 provided in the torque converter 13 for detecting a turbine rotational speed. The automatic transmission control unit 38 always monitors a change in turbine rotational speed to be input from the turbine rotation sensor 44. When a speed change operation command signal is generated from the automatic transmission control unit 38 to the automatic transmission 12, and thereafter the turbine rotational speed reaches an inflection point, the automatic transmission control unit 38 determines that the shift operation of the speed change gear has been actually started.

Between the automatic transmission control unit 38 and the engine control unit 24, transfer of signals is carried out. That is, in carrying out the speed change operation of the automatic transmission 12, the automatic transmission control unit 38 generates the speed change operation command signal to the speed change mechanisms 34a, 34b, 34c and 36 of the automatic transmission 12, and simultaneously outputs a signal indicative of the speed change operation to the engine control unit 24. Thereafter, the automatic transmission control unit 38 determines that the shift operation of the speed change gear has been actually started at the timing when the turbine rotational speed reaches the inflection point, and simultaneously outputs a signal of detection of the shift operation to the engine control unit 24.

The engine control unit 24 includes a means for measuring a response lag time Ta from a timing of receiving the speed change operation command signal generated from the automatic transmission control unit 38 to a timing of just receiving the shift operation detection signal indicative of actual start of the shift operation of the speed change gear generated from the automatic transmission control unit 38, a means for calculating a delay time Tb by subtracting a response lag time Tc due to response lag of engine output reduction control from the response lag time Ta measured above, and a means for calculating a learning value Tb(LRN) every time the speed change operation is carried out, by sampling the delay time Tb predetermined times and obtaining an average of the sampled values of the delay time Tb, for example. Thus, the engine control unit 24 starts the output reduction control of the engine 10 when a time equal to the learning value Tb(LRN) has elapsed from the timing of receiving the speed change operation command signal.

The response lag time Ta of the automatic transmission 12 is caused by response lag of a hydraulic system in the automatic transmission 12, for example. The response lag time Ta contains many uncertain fluctuation factors due to deterioration by aging or the like. On the other hand, the response lag time Tc can be univocally defined according to a specification characteristic of the engine 10, and it is substantially certain such that a fluctuation due to deterioration by aging or the like hardly occurs. Thus, the response lag time Tc can le preliminarily set and stored as a constant. Further, in deciding a start timing of the output reduction control of the engine 10, the delay time Tb plays an important role in order to make an end timing of the output reduction coincide with a start timing of the actual shift operation of the speed change gear. That is, by starting the output reduction control at a timing when the delay time Tb has elapsed from the receipt timing of the speed change operation command signal, the end timing of the output reduction of the engine 10 can be made to coincide with the start timing of the actual shift operation of the speed change gear. This delay time Tb can be reflected later in the output reduction control in the subsequent times. Further, the learning value Tb(LRN) already calculated at the previous time can be reflected in the output reduction control in the present time. By sampling the delay time Tb having fluctuation factors a predetermined number of time and then averaging the sampled values of the delay time Tb, a control accuracy of the output reduction control is improved.

That is, when a time equal to the learning value Tb(LRN) has elapsed from the receipt timing of the speed change operation command signal, the engine control unit 24 retards an output timing of an ignition signal to be output to the igniter 20 by a predetermined value from an ignition timing for obtaining a maximum engine output, thereby reducing an engine output by a predetermined quantity. The retard value of the ignition timing is preliminarily stored on a table in the engine control unit 24, and a predetermined retard value corresponding to an engine rotational speed is computed.

Figure 5:
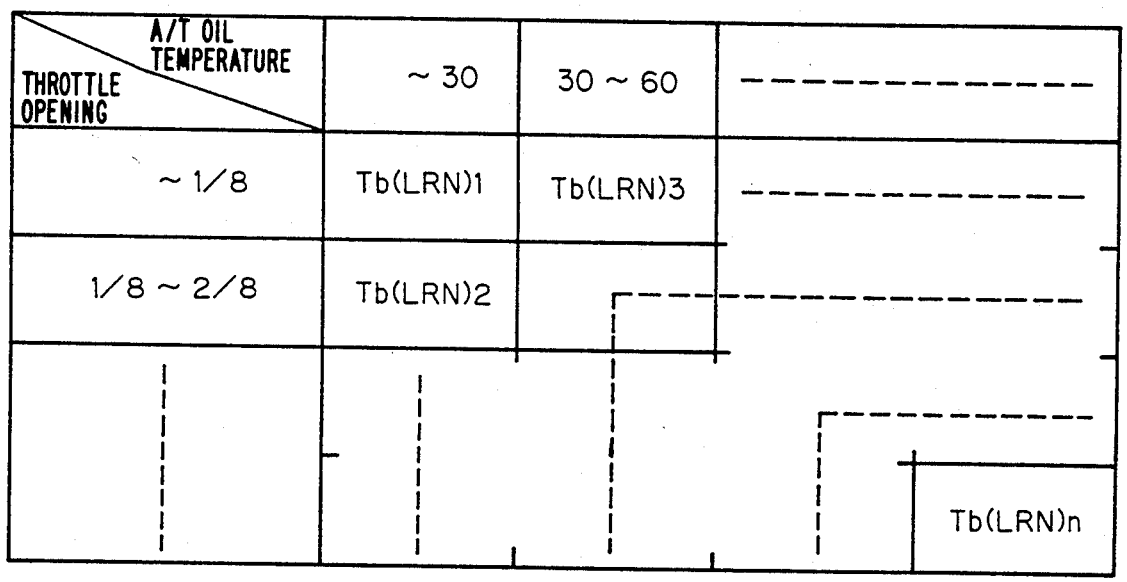
FIG. 5 is an illustration of a learning value map to be employed in the preferred embodiment according to the present invention.

Next, a flow of the engine output reduction control in the preferred embodiment will be described in more detail with reference to a flowchart shown in FIG. 3. First in step S10, engine rotational speed, suction air quantity, throttle opening, cooling water temperature, automatic transmission operating oil temperature, etc. are read as various condition information signals from the respective sensors. In the next step S20, a certain learning value Tb(LRN) corresponding to the automatic transmission operating oil temperature and the throttle opening read above is read from a learning value map (see FIG. 5) preliminarily set with a relationship to various automatic transmission operating oil temperatures and throttle openings. In the next step S30, determination is made as to whether or not a speed change operation command signal has been output. If this signal has not been output, the control flow is returned to step S10. On the other hand, if this signal has been output, the control flow proceeds to step S40, until a time equal to the above learning value Tb(LRN) has elapsed. If the time equal to the learning value Tb(LRN) has elapsed, the output reduction control of the engine 10 (retarding to an ignition timing) is executed in the next step S50. In the next step S60, a determination is made as to whether or not the speed change operation has ended. If not, the output reduction control is continued until the speed change operation has ended. If the speed change operation has ended, the output reduction control is stopped in the next step S70, and the control flow is returned. The end of the speed change operation is determined when a turbine rotational speed becomes equal to a value obtained by multiplying an engine rotational speed upon outputting of the speed change operation command signal by a gear ratio after speed change.

Figure 3:
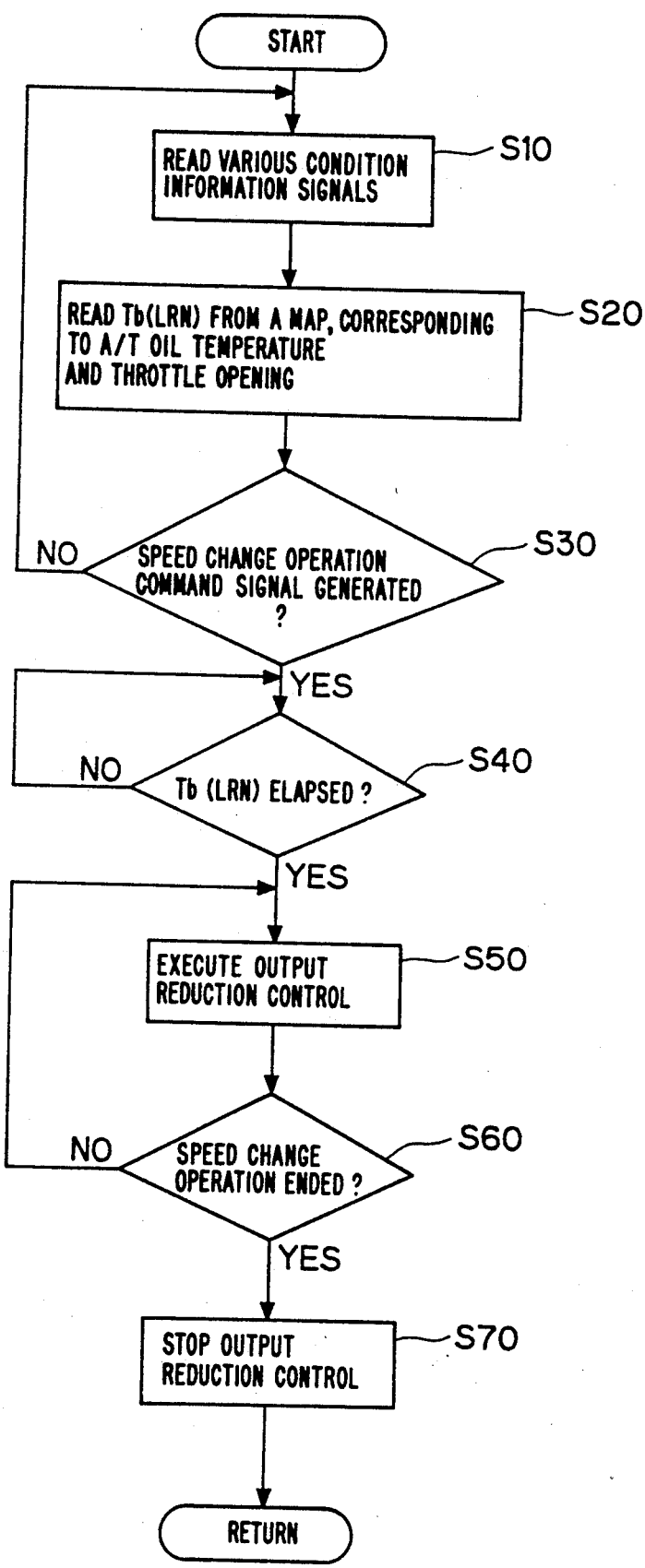
FIG. 3 is a flowchart showing a control logic of the output reduction control according to the present invention.
Figure 4:
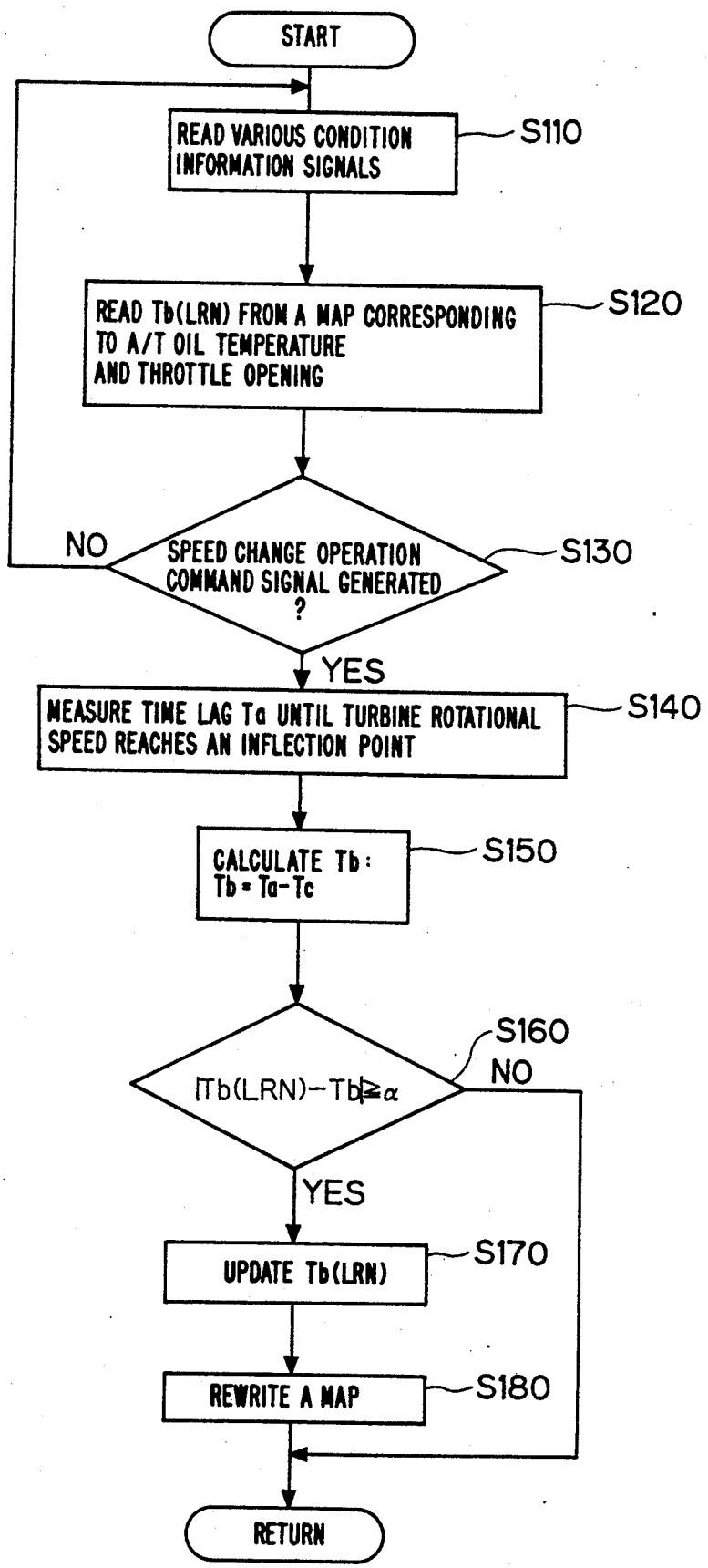
FIG. 4 is a flowchart showing a control logic of the updating control of the learning value Tb(LRN) according to the present invention.

Simultaneously with the output reduction control shown by the flowchart in FIG. 3, a learning value updating control shown by a flowchart in FIG. 4 is carried out.

In the updating control of the learning value Tb(LRN), first in step S110, engine rotational speed, suction air quantity, throttle opening, cooling water temperature, automatic transmission operating oil temperature, etc. are read as various condition information signals from the respective sensors. In the next step S120, a certain learning value Tb(LRN) is read from the learning value map as previously mentioned. In the next step S130, a determination is made as to whether or not a speed change operation command signal has been output. If this signal has not been output, the control flow is returned to step S110. On the other hand, if this signal has been output, the control flow proceeds to step S140, in which the response lag time Ta until a start timing of the actual shift operation of the speed change gear, that is, until a timing when a turbine rotational speed reaches an inflection point, is measured.

After the measurement of the response lag time Ta, the control flow proceeds to step S150, in which the delay time Tb is calculated by subtracting the response lag time Tc from the response lag time Ta. In the next step S160, determination is made as to whether or not a difference between the delay time Tb calculated above and the learning value Tb(LRN) read above is not less than a given value $\alpha$. If this difference is less than the given value $\alpha$, the learning value Tb(LRN) is not updated, but the control flow is returned. On the other hand, if this difference is not less than the given value $\alpha$, the control flow proceeds to step S170, in which a new learning value Tb(LRN) is calculated to update the present learning value Tb(LRN). Then, in step S180, the old value stored in the corresponding memory area of the learning value map (FIG. 5) is rewritten to the updated value newly calculated above, and the updated value is stored. The updated value may be calculated by bringing the present learning value Tb(LRN) close to the present delay time Tb by $\frac{1}{2}$ of a difference between both the values Tb(LRN) and Tb.

Figure 2:
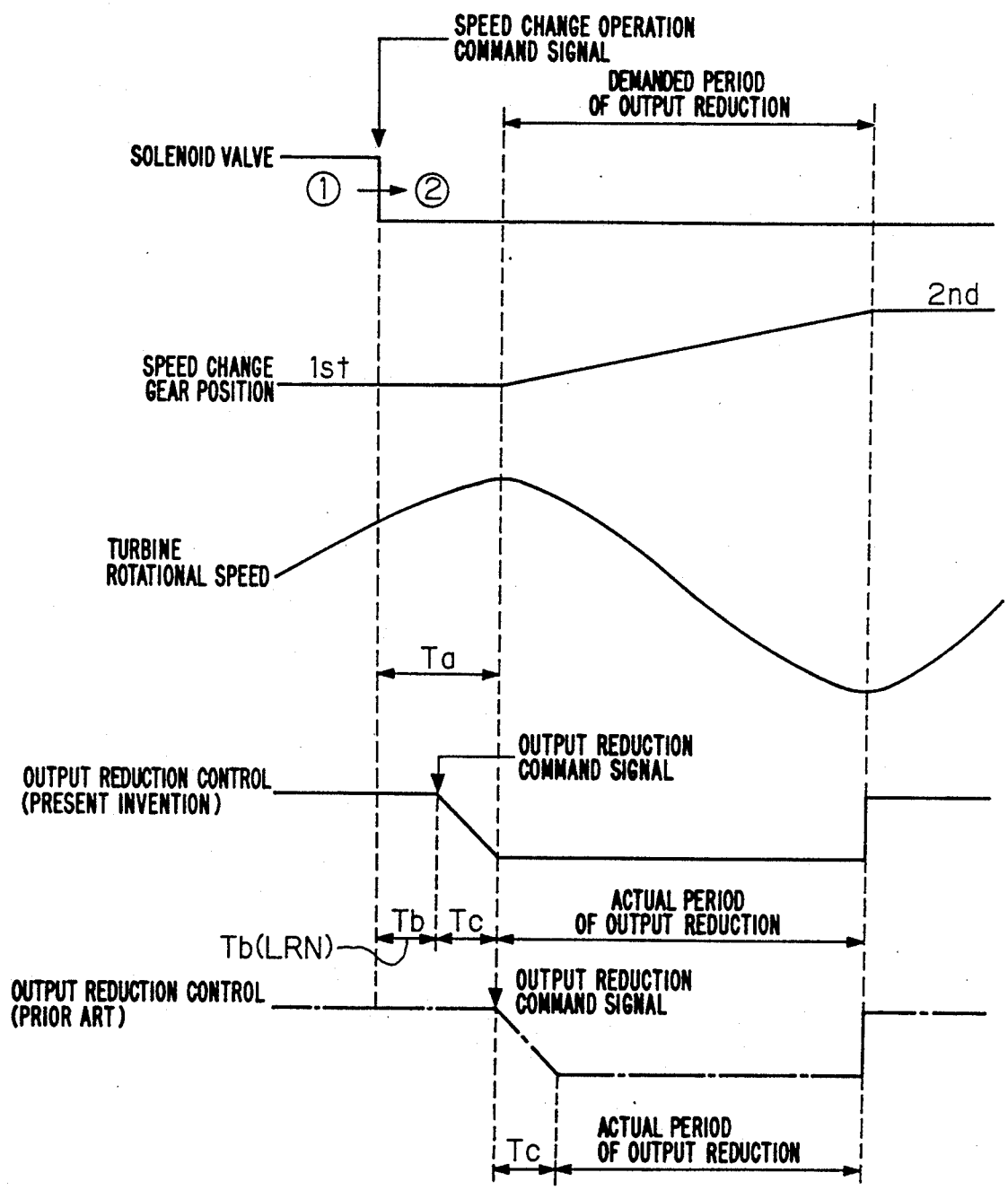
FIG. 2 is a time chart showing the comparison between the output reduction control according to the present invention and the output reduction control in the prior art.

In the control system for the engine with the automatic transmission according to the preferred embodiment, as shown by the time chart shown in FIG. 2, at the timing when the time equal to the learning value Tb(LRN) has elapsed after outputting of the speed change operation command signal from the automatic transmission control unit 38 to the speed change mechanisms 34a, 34b and 34c of the automatic transmission 12, constituted with the solenoids, the output control of the engine 10 is started. Then, at the timing when the response lag time Tc due to the response lag of the engine 10 has elapsed after starting of the output reduction control of the engine 10, the output of the engine 10 reaches a predetermined reduced value. Accordingly, at the timing when the total time equal to Tb(LRN)+Tc has elapsed after outputting of the speed change operation command signal, the output of the engine 10 reaches a predetermined reduced value.

The learning value Tb(LRN) is obtained by learning the delay time Tb a predetermined number of times, and the delay time Tb is obtained by subtracting the response lag time Tc of the output reduction control of the engine 10 from the response lag time Ta of the automatic transmission 12 which response lag time Ta is a period of time from the start timing of the speed change operation in receipt of the speed change operation command signal by the automatic transmission 12 to the start timing of the actual shift operation of the speed change gear. Therefore, the total time of Tb(LRN)+Tc is almost approximated to the response lag time Ta. Accordingly, the timing when the output of the engine 10 is completed can be made to almost coincide with the start timing of the actual shift operation of the speed change gear. As a result, a speed change shock generated in the speed change operation can be greatly suppressed.

In the above preferred embodiment, the output reduction control unit 46 is constructed of the ignition system, and a reduction quantity of engine output is controlled by controlling an ignition timing. However, as a modification, the output reduction control unit 46 may be constructed of a fuel supply system, and the reduction quantity of engine output may be controlled by controlling an air-fuel ratio or a fuel supply quantity. Alternatively, the output reduction control unit 46 may be constructed of both the ignition system and the fuel supply system in combination.

What is claimed is:

1. A control system for an engine with an automatic transmission, comprising:

an output reducing means for reducing an output of said engine by a predetermined quantity in a speed change operation of said automatic transmission, so as to suppress a speed change shock generated in the speed change operation; and output reduction control means for controlling a start timing of operation of said output reducing means so as to make a timing when output reduction of said engine is completed by said output reducing means coincide with a start timing of an actual gear shift operation of said automatic transmission;

wherein said output reduction control means comprises:

a speed change operation start timing detecting means for detecting input of a speed change operation command signal into said automatic transmission;

a response lag time measuring means for measuring a response lag time of said automatic transmission from a timing of detection of said speed change operation command signal to the start timing of the actual gear shift operation of said automatic transmission;

an output reduction control executing means for starting the output reduction of said engine when a preset delay time has elapsed form the timing of detection of said speed change operation command signal; and a delay time setting means for calculating said delay time and storing same as a new set value so that the output reduction of said engine is completed at a timing when a substantially constant time has elapsed from a start timing of the output reduction of said engine, and the timing when the output reduction of said engine is completed is made to coincide with the start timing of the actual gear shift operation of said automatic transmission.

2. The control system as claimed in claim 1, wherein said output reducing means comprises an ignition timing control system for advancing or retarding an ignition timing to reduce the output of said engine.

3. The control system as claimed in claim 1, wherein said output reducing means comprises an air-fuel mixture control system for reducing a suction air quantity or a fuel supply quantity to be supplied to said engine to reduce the output of said engine.

4. The control system as claimed in claim 2, wherein said response lag time measuring means measures said response lag time Ta by detecting an inflection point of an input rotational speed of said automatic transmission as the start timing of the actual gear shift operation of said automatic transmission.

5. The control system as claimed in claim 2, wherein said delay time setting means calculates said preset delay time by subtracting said constant time from said substantially response lag time.

6. The control system as claimed in claim 5, wherein said delay time setting means computes a learning value by sequentially calculating said preset delay time and sampling calculated values of said preset delay time a predetermined number of times, and stores said learning value as said new set value.

7. The control system as claimed in claim 6, wherein said delay time setting means includes a memory map having a plurality of memory areas each preliminarily storing an initial set value of said learning value of said preset delay time on the basis of a relation to a throttle opening and an automatic transmission operation oil temperature, and said learning value computed is stored into each memory area.

8. A control system for an engine with an automatic transmission, comprising:

an output reducing means for reducing an output of said engine by a predetermined quantity in a speed change operation of said automatic transmission by advancing or retarding an initiation timing, so as to suppress a speed change shock generated in the speed change operation;

a speed change operation start timing detecting means for detecting input of a speed change operation command signal into said automatic transmission;

a response lag time measuring means for measuring a response lag time of said automatic transmission from a timing of detection of said speed change operation command signal to a start timing of an actual gear shift operation of said automatic transmission, wherein said start timing is identified by detecting an inflection point of an input rotational sped of said automatic transmission;

a delay time storing means having a plurality of memory areas each preliminarily storing a learning value of a delay time form the timing of detection of said speed change operation command signal to an output timing of an engine output reduction command signal for staring output reduction of said engine on the basis of a relationship to a throttle opening and an automatic transmission operating oil temperature;

an output reduction control means for outputting said engine output reduction command signal to said output reducing means when said learning value of said delay time preliminarily stored in said each memory area has elapsed from the timing of detection of said speed change operation command signal;

a delay time calculating means for calculating said delay time by subtracting a substantially constant time frm the output timing of said engine output reduction command signal to the timing when the output reduction of said engine is completed, from said response lag time measured by said response lag time measuring means, so as to make the timing when the output reduction of said engine is completed coincide with the start timing of the actual gear shift operation of said automatic transmission; and a learning value updating means for comparing said delay time calculated by said delay time calculating means with said learning value stored in the corresponding memory area of said delay time storing means, and calculating a new value of said learning value if a difference between said delay time and said learning value is not less than a given value, and then updating said learning value previously stored in the corresponding memory area to store said new value into the corresponding memory area.

* * * * *